(12) United States Patent
Someya

(10) Patent No.: US 6,359,627 B1
(45) Date of Patent: Mar. 19, 2002

(54) METHOD FOR SELECTING A GRAPHIC PRIMITIVE AND A RECORDING MEDIUM

(75) Inventor: Tadashi Someya, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/090,052

(22) Filed: Jun. 3, 1998

(51) Int. Cl.$^7$ .......................... G06T 11/00; G06T 15/00
(52) U.S. Cl. ...................... 345/619; 345/419; 345/642
(58) Field of Search ................................ 345/419, 420, 345/435, 421, 422, 433, 619, 642

(56) References Cited

U.S. PATENT DOCUMENTS

| | | | | |
|---|---|---|---|---|
| 5,201,035 A | * | 4/1993 | Stytz et al. ............. | 345/421 X |
| 5,329,613 A | * | 7/1994 | Brase et al. ............. | 345/421 X |
| 5,371,514 A | * | 12/1994 | Lawless et al. .............. | 345/435 |
| 5,459,829 A | * | 10/1995 | Doi et al. ................ | 345/431 X |
| 5,581,670 A | * | 12/1996 | Bier et al. ............... | 345/435 X |
| 5,596,690 A | * | 1/1997 | Stone et al. ................. | 345/435 |
| 5,729,254 A | * | 3/1998 | Marks et al. ................ | 345/420 |
| 6,028,608 A | * | 2/2000 | Jenkins ........................ | 345/433 |

* cited by examiner

Primary Examiner—Matthew Luu
Assistant Examiner—Chanté Harrison
(74) Attorney, Agent, or Firm—Ronald L. Drumheller

(57) ABSTRACT

To select a graphic primitive hidden behind a graphic primitive displayed in foreground, a point on the display screen is pointed to by a pointing device. A CPU detects graphic primitives that include the specified point based on the position and the size indicated by the graphic primitive information stored in the system memory and further detects the smallest graphic primitive completely included in one or more graphic primitives among the detected graphic primitives. The detected smallest graphic primitive is thereafter processed as the selected graphic primitive.

2 Claims, 3 Drawing Sheets

METHOD FOR SELECTING A GRAPHIC PRIMITIVE AND A RECORDING MEDIUM

BACKGROUND OF THE INVENTION

1. Field of the Invention

This invention relates to a method for selecting a plurality of graphic primitives displayed on a display screen for image processing and a recording medium.

2. Related Art

An image processing system for drawing a picture on a display screen using a graphic software on a computer such as a personal computer has been known. Such prior art system draws a plurality of graphic primitives including a rectangle and a circle for displaying on a display screen. As to the display position of the graphic primitive, the displayed graphic primitive can be moved by a dragging process (moving a pointing device while a click button is held depressed) of a pointing device such as a mouse. With such picture drawing process, a plurality of graphic primitives may be overlapped. When the internal area of a graphic primitive is solidly painted with a certain color, an overlapping portion of a graphic primitive drawn earlier is hidden by a graphic primitive drawn or moved later.

This is because graphic primitive data for display is stored by being overwritten with later graphic primitive data so that the overwriting graphic data is displayed. In an extreme case, the graphic primitive 101 is entirely hidden by the graphic primitive 100 as shown in FIG. 3. Therefore, when the user wants to select the graphic primitive 101, the user will perform an operation of selecting the graphic primitive 101 by moving the graphic primitive 101 to display a portion of the graphic primitive 100 or the position characterizing the graphic primitive, for example, the contour line and then pointing that portion by a pointing device.

Because the above operation is cumbersome for a user, a graphical user interface has been proposed which employs a graphic primitive selecting method in which overlapping portions are pointed by operating the click button to select a graphic primitive immediately behind the foremost graphic primitive and, by further pointing the portions, graphic primitives next behind are selected in sequence. Incidentally, this selecting method has also proposed a method of allowing said graphic primitive next behind to be selected by clicking the click button of a pointing device while operating a specific key of the keyboard Because a graphic primitive entirely hidden by a fore graphic primitive is not known unless the fore graphic primitive is moved out or the sequence of overlap is changed in the graphic primitive selecting method of selecting each graphic primitive behind one after the other by each operation of the click button of the pointing device, many operations are required until the user obtains a desired graphic primitive when many overlapping graphic primitives are displayed.

SUMMARY OF THE INVENTION

It is therefore an object of this invention to provide a method of selecting a graphic primitive which enables a graphic primitive hidden by the fore graphic primitive displayed to be selected easily and a recording medium.

To achieve the above objective, the invention provides a graphic primitive selecting method for selecting a graphic primitive displayed on a display screen by a pointing device comprising; storing graphic primitive information indicating the position and the shape of said graphic primitive in a memory device, extracting the graphic primitive information of the graphic primitive including the position pointed by the pointing device from the graphic primitive information stored in said memory device when pointing is effected by the pointing device, detecting a graphic primitive which is included in one or more graphic primitives among the graphic primitive indicated by the extracted graphic primitive information and treating the detected graphic primitive as a graphic primitive selected by the pointing device.

The invention also provides a computer readable recording medium storing therein a program for selecting a graphic primitive by a pointing device from a plurality of graphic primitives which are stored in a computer memory device as a plurality of graphic primitive information including at least information of display position and the shape and displayed on a display screen of said computer, said program comprising: (a) program code means instructing said computer to recognize the position information indicated by said pointing device, (b) program code means for instructing said computer to extract a graphic primitive information including the position indicated by said position information and, (c) program code means for instructing said computer to detect a graphic primitive which is included in one or more graphic primitives among graphic primitives indicated by said extracted graphic primitives.

DESCRIPTION OF THE PREFERRED EMBODIMENTS

Figure 1:
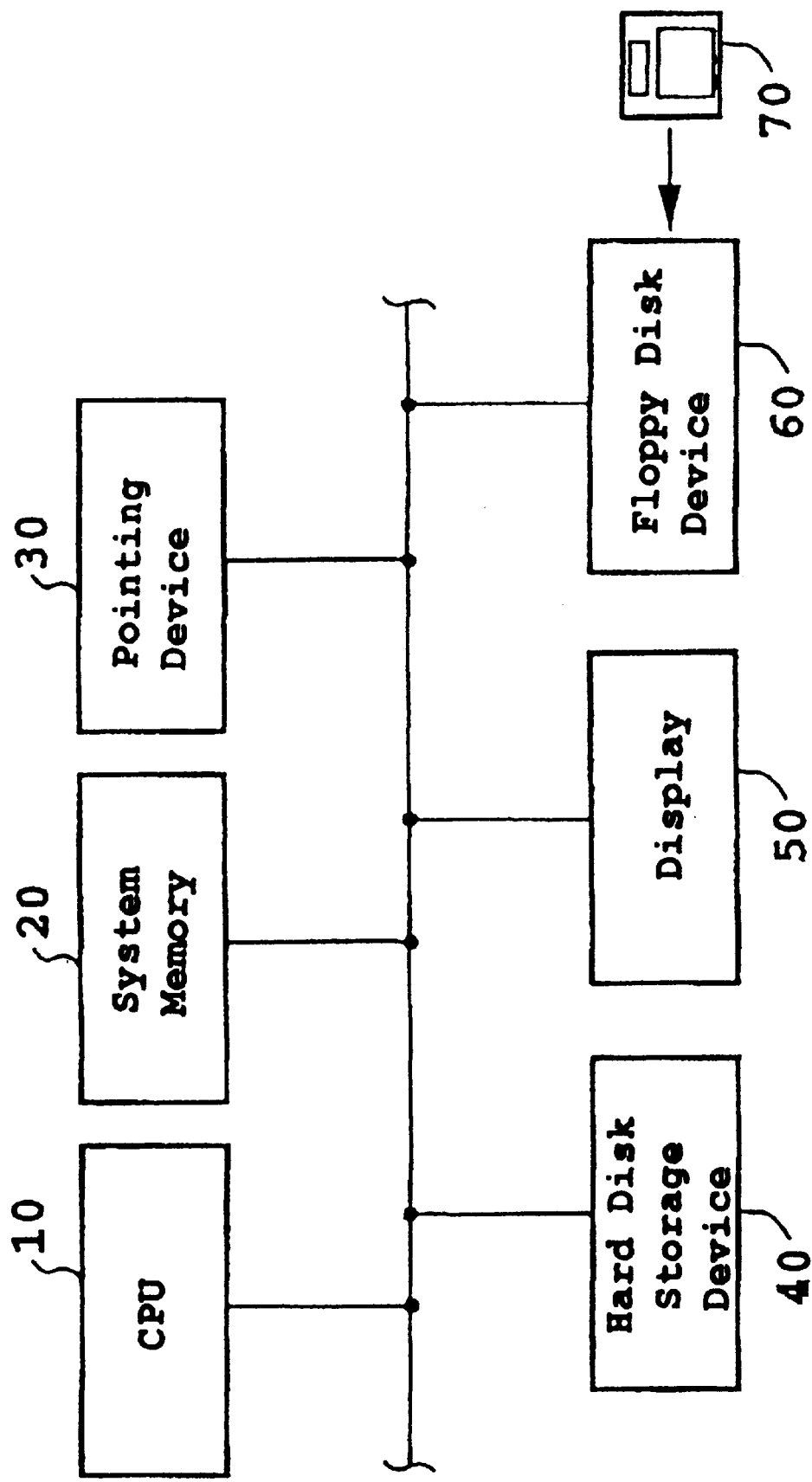
FIG. 1 is a block diagram showing the system configuration of a mode of practicing this invention.

FIG. 1 shows an example of the configuration of a computer which has an image processing function to which this invention is applied. In FIG. 1, a system memory 20, a pointing device 30, a hard disk storage device (HDD) 40 and a display 50 are connected to a CPU 10. Because existing components are available for the hardware configuration, an interface board, a connector and a cable, etc., interposed between said components and the CPU 10 are not shown in the figure.

The system memory 20 comprising a ROM and a RAM preserves in the ROM various control data including font data used for the system control of the CPU 10 and stores data used for arithmetic of the CPU 10 as well as image data for display in the display 50 in the RAM. For example, the pointing device 30 such as a mouse is used for pointing the position on the display screen of the display 50.

A floppy disk 70 (or a medium such as an MO and a CD-ROM) is inserted in a floppy disk device (or a medium drive device for an MO and CD-ROM, etc.) 60. A computer program code providing instructions to the CPU, etc., in cooperation with an operating system for practicing this invention may be recorded in the floppy disk 70, a hard disk device 40 and the ROM and executed by being loaded in the memory 20. The computer program code may be compressed or divided into a plurality of pieces which are recorded over a plurality of media.

In this mode of practicing this invention, a mouse is explained as a pointing device 30. The hard disk storage device 40 stores a system program for controlling the above described components ( also called a driver), a graphic software involved in the image processing and a graphic primitive prepared (in the form of a file), etc. While the processing procedure of FIG. 2 of this invention is described in a graphic software, it may be described in a graphical user interface provided by the system. The display 50 displays a display image stored in the system memory by the control of the CPU 10.

Figure 2:
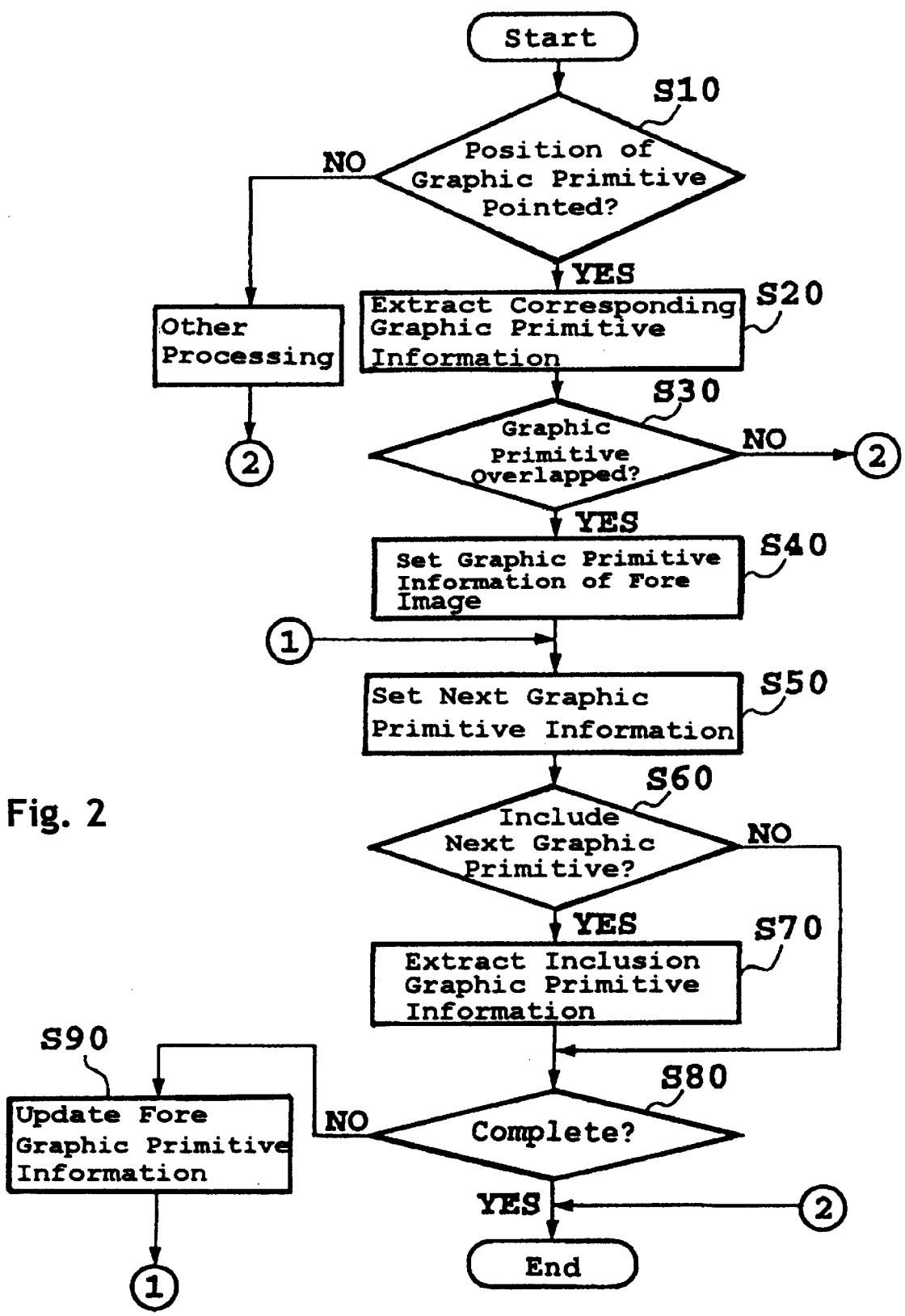
FIG. 2 is a flow chart showing a processing procedure for selecting a graphic primitive.
Figure 3:
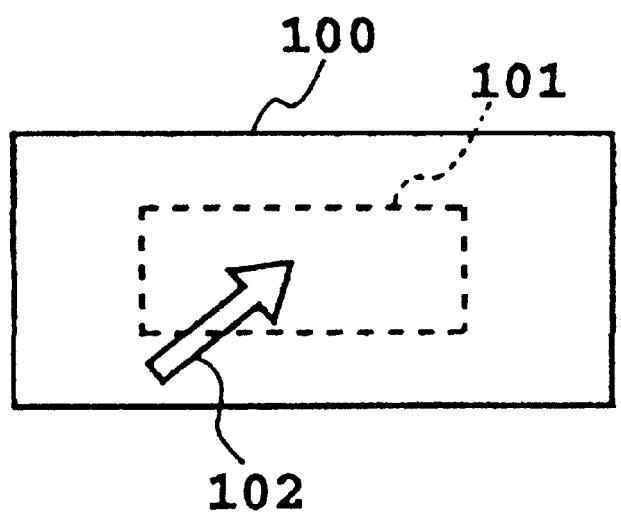
FIG. 3 is a chart illustrating an example of graphic primitives.

A graphic primitive selection process performed with such system configuration is now described with reference to the flow chart of FIG. 2. It is assumed that the user has beforehand prepared the graphic primitives 101 and 100 as shown in FIG. 3 using a graphic software. In this status, the graphic primitive 101 is positioned behind the graphic primitive 100 and completely hidden by the graphic primitive 100. When such drawing process is performed, a parameter indicating the shape of the graphic primitive (rectangle in this case) and information indicating the position and the size of the graphic primitive (the position coordinates of the two opposing corner of the rectangle in this case) are stored in the system memory 20. The above parameter and the position information will be collectively called a graphic primitive information hereinafter. Incidentally, the information indicating the position and the size of a circular graphic primitive are the coordinate of the center position and the length of the radius.

Such graphic primitive information is generated on the system memory 20 each time an graphic primitive is drawn on the display screen and updated by the CPU 10 corresponding to the position and the shape for every change of the display position and the shape. Because such image processing is well known, there will be no need to explain it in detail.

In the display status as shown in FIG. 3, the user manipulates the pointing device 30 to move a cursor image (hereinafter simply called cursor) 102 indicating the pointing position of the pointing device 30 to the position as shown in FIG. 3 and single clicks the click button. This manipulation is detected by the CPU 10 (step S10 in FIG. 2) and the processing procedure of FIG. 2 is initiated by the CPU 10. When the CPU 10 acquires the position pointed by the pointing device 30, it detects the graphic primitive including that position. While this method is well known in the art, an example is introduced here. Because a graphic primitive is stored in the system memory 20, a determination program (or a function) is executed for each shape parameter in the graphic primitive information. When the graphic primitive is a rectangle, it is determined that the position pointed by the pointing device 30 is within the rectangular graphic primitive when the position (X,Y) specified by using position coordinates of the opposing corners of the rectangle (x1,y1) and (x2,y2) satisfies a positional relationship:

$$x1 < X < x2 \text{ and } y1 < Y < y2$$

or $$x2 < X < x1 \text{ and } y2 < Y < y1$$

When the graphic primitive is a circle, it can be determined that the position pointed by the pointing device 30 is included within the circular graphic primitive if the distance between the position pointed by the pointing device 30 and the center position of the circular graphic primitive is less than the radius of the circular graphic primitive. By applying such determination to each graphic primitive information, a graphic primitive information satisfying the above condition is detected so that the graphic primitive candidate (in the form of graphic primitive information) which the pointing device 30 attempts to select can be extracted (step S20). The extracted graphic information is temporarily stored in the system memory 20.

When the CPU 10 recognizes that there are a plurality of extracted graphic primitives, it determines that graphic primitives are overlapped on the display (step S30) and detects the smallest graphic primitive hidden in the largest graphic primitive (the largest graphic primitive displayed on the display screen, the graphic primitive 101 in FIG. 3) among the graphic primitives indicated by the extracted graphic information (step S40, and the loop process of S50, ... S90). To this end, the inclusion relation of graphic primitives indicated by the graphic primitive information are examined by mutually comparing the graphic primitives to detect the graphic primitive information of the smallest graphic primitive included. The inclusion relation of rectangles can be determined by mutually comparing the position coordinates of 4 edges of the rectangles (or the position coordinates of the 4 corners). Presence or absence of inclusion may be determined for circles and rectangles by a determination equation using graphic primitive information. When the inclusion relation of graphic primitives indicated by all graphic primitive information have been examined, the smallest graphic primitive included in the graphic primitives is detected. In this mode of practicing this invention, the smallest detected graphic primitive (the graphic primitive 101 in the case of FIG. 2) is treated as a graphic primitive selected by pointing by the pointing device 30.

In a simple pointing of a position, the CPU 10 performs an image processing to display the selected graphic primitive foremost while, when the graphic primitive is selected for movement, the CPU 10 performs a moving process. The manner in which a selected graphic primitive is to be processed is decided by a processing instruction indicated with respect to pointing. When there is no graphic primitive completely hidden at a pointed position, the graphic primitive positioned foremost is treated as being selected in this mode of practicing this invention.

Figure 4:
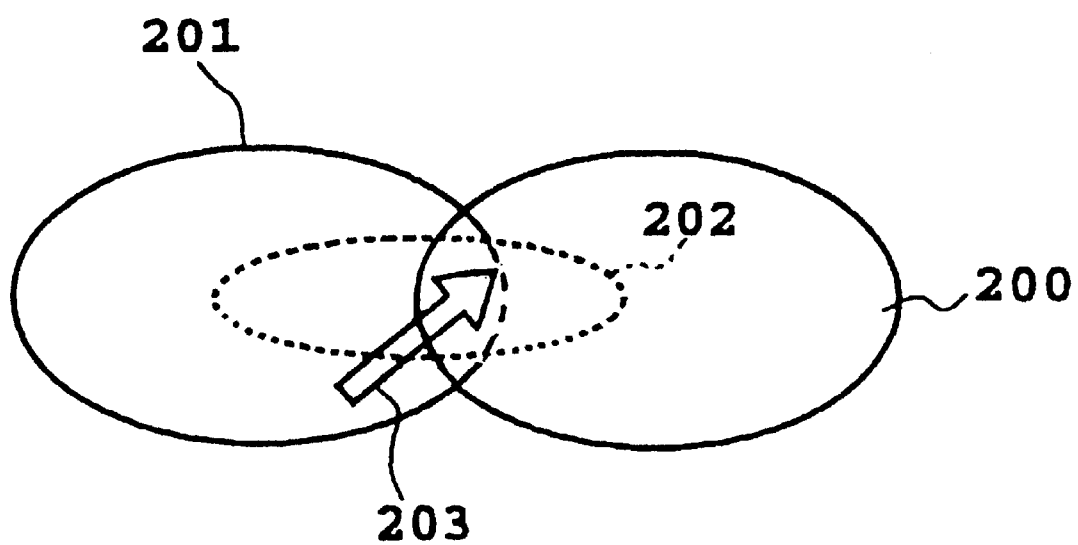
FIG. 4 is a chart illustrating another example of graphic primitives.

In the above described mode of practicing, the smallest graphic primitive which is completely hidden by one graphic primitive is detected. Next, a mode of detecting the smallest graphic primitive which is completely hidden by a plurality of displayed graphic primitives will be described. FIG. 4 shows an example of displayed graphic primitives where an elliptic graphic primitive 200 and an elliptic graphic primitive 201 are displayed in overlapped relation with the elliptic graphic primitive 200 being fore in the overlapped portion. An elliptic graphic primitive 202 is in a state in which it is completely hidden by the elliptic graphic primitives 200, 201. In such display state, the completely hidden elliptic graphic primitive 202 is the selected graphic primitive when the user points by the pointing device 30 the position indicated by the cursor 203, that is, the position where the overlapped portion lies in this mode of practicing this invention. When such processing is performed, a graphic primitive which is included in a closed image area which consists of a plurality of displayed graphic primitives will be detected. More specifically, according to a selecting condition to lower a priority of selection of graphic primitive information constituting upper, lower, left and right edges of a global graphic primitive which includes the position pointed by the pointing device 30 and eliminate them from candidates of selection, they are eliminated from the candidates of selection and a completely hidden graphic primitive is detected by assuming a global graphic primitive comprising the remaining graphic primitives.

As an alternative, determination is done as if there is an overlapped display when a graphic primitive is drawn or moved and a flag is set for a graphic primitive information of a graphic primitive displayed in the display screen. By so doing, a process of detecting a global graphic primitive formed by a plurality of graphic primitives from the graphic primitive information may be omitted. It should be also understood that any well known method may be used to determine an inclusion relation between 2 graphic primitives.

In another mode of practicing this invention, it is possible to perform a process to select a graphic primitive hidden by one or more fore graphic primitives and display it foremost as described in the above and thereafter return it to the original position by double clicking the pointing device 30. With such processing, it is easy to find a graphic primitive the position of which is unknown on the display screen and which is hidden by the fore graphic primitive.

As described in the above, a hidden graphic primitive can be selected without moving the graphic primitive displayed fore the hidden graphic primitive because a graphic primitive hidden behind (in the back side) the fore graphic primitive at a position pointed by the pointing device 30 is selected. This makes the operation easy in displaying a selected graphic primitive fore or move it.

What is claimed is:

1. A method of selecting a graphic primative that is partly or fully hidden by one or more foreground graphic primatives on a display screen, comprising the steps of:

pointing to a position on a display screen with a pointing device to point to a graphic primative located at that position that is partly or fully hidden by one or more foreground graphic primatives;

determining whether or not the pointed to graphic primative is fully hidden by the one or more foreground graphic primatives;

if the pointed to graphic primative is fully hidden by the one or more foreground graphic primatives, automatically selecting the pointed to graphic primative without first unhiding the pointed to graphic primative; and otherwise, selecting the particular graphic primative which is not hidden at the position pointed to on the display screen by the pointing device.

2. A computer readable recording medium storing therein a program for selecting a graphic primitive that is partly or fully hidden by one or more foreground graphic primatives on a display screen, said program comprising:

program code for pointing to a position on a display screen with a pointing device to point to a graphic primative located at that position that is partly or fully hidden by one or more foreground graphic primatives;

program code for determining whether or not the pointed to graphic primative is fully hidden by the one or more foreground graphic primatives;

program code for automatically selecting, if the pointed to graphic primative is fully hidden by the one or more foreground graphic primatives, the pointed to graphic primative without first unhiding the pointed to graphic primative; and program code for otherwise selecting the particular graphic primative which is not hidden at the position pointed to on the display device by the pointing device.

* * * * *